United States Patent [19]

Yong et al.

[11] Patent Number: 4,507,209

[45] Date of Patent: Mar. 26, 1985

[54] DESTABILIZATION OF SLUDGE WITH HYDROLYZED YAM STARCH FLOCCULANTS

[75] Inventors: Raymond N. Yong, Beaconsfield; Amar J. Sethi, Baie D'Urfe, both of Canada

[73] Assignee: Suncor, Inc., Toronto, Canada

[21] Appl. No.: 562,353

[22] Filed: Dec. 16, 1983

[51] Int. Cl.³ .......................... C02F 1/54; C02F 11/14
[52] U.S. Cl. ............................... 210/728; 208/11 LE; 210/731; 210/907
[58] Field of Search ...................... 127/32, 33, 38, 70, 127/71; 208/11 LE; 210/609, 725, 727, 728, 731, 907; 536/102

[56] References Cited

U.S. PATENT DOCUMENTS 4,289,540  9/1981  Yong et al. .......................... 210/729
4,399,039  8/1983  Yong ................................... 210/728
4,414,117  11/1983  Yong et al. ......................... 210/727

FOREIGN PATENT DOCUMENTS 47-20601  6/1972  Japan .................................. 210/731
516294  12/1939  United Kingdom .................. 127/33

OTHER PUBLICATIONS

Chemical Abstracts, 76-26575K, 1972.

Primary Examiner—Peter Hruskoci
Attorney, Agent, or Firm—Paul Lipsitz

[57] ABSTRACT

Certain yam starches hydrolyzed in the presence of insoluble metal salts formed in situ are surprisingly effective flocculants for destabilizing dilute as well as thick sludge suspensions and are particularly effective when used in the treatment of bituminous tar sands tailings and in phosphate slimes.

5 Claims, No Drawings

DESTABILIZATION OF SLUDGE WITH HYDROLYZED YAM STARCH FLOCCULANTS

BACKGROUND OF THE INVENTION

This invention relates to a novel hydrolyzed yam starch composition and the process for making and using the same. More particularly, this invention relates to the discovery that the starch of certain varieties of yams which is hydrolyzed in the presence of insoluble metal salts formed in situ is a surprisingly effective flocculant in destabilizing dilute as well as thick sludge suspensions.

In general, the suspensions destabilized by the starch composition of this invention are aqueous colloidal suspensions containing either clay minerals or metal oxides-hydroxides which are formed in large volume during mining operations in the recovery of such materials as coal, bitumen from tar sands and metals and such suspensions are also formed in paper making operations. In the case of metal mining operations, suspensions known as slimes are formed, typically phosphate slimes or like materials produced in the mining of copper, nickel, and titanium. In coal and tar sands minings, for example, the mining effluent typically contains dilute or thick clay mineral suspensions. In paper making processes cellulosic fines, clays and other solids are present in the large volumes of liquids obtained.

In order to properly dispose of these voluminous mining discharges, regardless of their source, flocculants have conventionally been employed to destabilize these suspensions and thus permit the effective separation of water from solids. The use of wheat, corn and potato starch which has been hydrolyzed in the presence of metal salts formed in situ has been disclosed in U.S. Pat. No. 4,289,540 which issued on Sept. 15, 1981 and is hereby incorporated by reference. It has now been found that surprisingly superior flocculation is obtained if starch from certain specific varieties of yam is used for preparing the hydrolyzed starch composition to give the starch flocculant.

OBJECTS OF THE INVENTION

It is, therefore, an object of this invention to provide an effective flocculant in destabilizing dilute as well as thick sludge suspensions, particularly colloidal suspensions obtained from mining operations.

It is a further object of our invention to provide an effective flocculating agent for treating tar sands tailing streams which carry suspended clay particles.

It is another object of our invention to provide such a flocculating agent which is economical to prepare and employ in the treatment of both tar sands tailing streams and phosphate slimes obtained from phosphate mining operations.

In another aspect, it is yet another object of our invention to provide such a flocculant which is safe and easy to handle and which itself offers no ecologically undesirable side effects.

BRIEF SUMMARY OF THE INVENTION

In accordance with the present invention, it has been found that the foregoing and other objects may be achieved by employing as a flocculant in destabilizing dilute as well as thick sludge suspensions a hydrolyzed starch obtained from Cocoa Yam, Negro Yam or Sweet Yam. More particularly, it has been found that when these starches have been hydrolyzed in the presence of metal salts formed in situ there is formed a surprisingly effective composition for destabilizing such suspensions. Still more particularly, an especially effective flocculant composition is the calcium alumino phosphate yam starch.

As aforestated, the sludges being treated in accordance with this invention are aqueous colloidal suspensions containing either clay minerals or metal oxides-hydroxides which are formed during mining operations or other operations generating such suspensions. For sake of illustration and simplicity only, the following description will be directed to a colloidal clay suspension obtained from bituminous tar sands mining. However, it will be understood that this invention is directed generally to the destabilization of all such suspensions.

PREPARATION OF THE HYDROLYZED STARCH

As aforementioned, the flocculant is prepared from the specific yam starch which has been hydrolyzed in the presence of inorganic salts formed in situ.

The hydrolysis of the yam starch is achieved by simply heating the starch in the form of an aqueous suspension at about 85° to 95° C. and preferably at about 90° C. in the presence of soluble metal salts which will form an insoluble salt in situ. The starch should desirably be present in an amount of 1 gm to 10 per 100 ml of water, and preferably 2 to 6 gms per 100 mls of water.

Among the salts which may be employed during the hydrolysis are salts of metals such as sodium, potassium, ammonium, magnesium, calcium, and aluminum. The respective anions may be sulfates, acetates, chlorides, nitrates, chlorates, bromides, iodides, thiocyanates, phosphates, and the like. Particularly effective for purposes of this invention, as applied to tar sands tailing ponds, is calcium alumino phosphate yam starch, although such other salts containing sodium, aluminum, and phosphate ions and the like may also be used. As indicated, the salts are added as soluble salts in order to form the insoluble salt in situ. Thus, for example, the preferred calcium aluminum phosphate salt is advantageously formed in situ by the addition of calcium hydroxide, aluminum sulfate, and sodium phosphate to the aqueous yam starch hydrolysis medium. In any event, the resulting salt should desirably by present in amounts of about 10 to 30 gms per 100 gms of starch, and preferably 15 to 20 gms per 100 gms of starch.

In the case of treatment of known phosphate slimes from phosphate mining operations with the flocculant of this invention, it will be understood that the presence or addition of a phosphate such as sodiun phosphate, is not necessary and may be omitted from the salt preparation.

If desired, the yam starch hydrolysate may be dried to remove water by freeze drying, air drying, spin drying, or the like, to provide a solid powder composition which is convenient to handle, store and transport and which can readily be redispersed in water at the treatment site.

The following examples are provided for purposes of illustrating but do not limit the scope of this invention with respect to the preparation and use of the yam starch flocculants.

SYNTHESIS OF HYDROLYZED YAM STARCH FLOCCULANT

Five grams of the specific yam starch is weighed into a flask fitted for refluxing. Two hundred milliliters of aqueous solution containing 0.617 gm of $Al_2(SO_4)_3.18H_2O$, 0.704 gm. $Na_3PO_4.12H_2O$, amd 0.463 gm $Ca(OH)_2$ is added to form calcium alumino phosphate in situ in the presence of the starch.

The suspension is refluxed as 90° C.±5° for two hours with simultaneous stirring. The hydrolysis is considered complete when the insoluble starch is converted into a colloidal solution. The volume is then made up to 250 ml with distilled water, thus giving a stock solution of 20,000 ppm of calcium aluminum phosphate yam starch.

A preferred procedure for making the hydrolyzed yam starch employs the method described in U.S. patent application Ser. No. 327,850, filed Dec. 7, 1981, which application is also incorporated herein by reference. In the preferred method, an aqueous suspension of the starch, alum and lime is heated until maximum viscosity of the suspension is obtained, and immediately thereafter, the salt to be added (e.g. trisodium phosphate) is added to the mixture. The general procedure for such preferred method is as follows:

To 2.67 liters of tap water add 109.89 g yam starch, 10.18 g lime and 6.78 g alum and heat the mixture with stirring at a constant speed of 100 rpm at a rate of 0.5° C. per minute. Stirring is carried out with a Cole-Palmer Master Servodyne torque stirrer calibrated to give viscosity value. As heating and stirring are continued the viscosity is observed to rise significantly when a temperature of about 60° C. is reached and continues to rise until about 70° C. is reached, at which point it begins to fall and then 15.46 g of trisodium phosphate ($Na_3PO_4$) is immediately added. Heating and stirring at the same rate is continued until a temperature of 85° is reached, and then the heat is removed and the material is allowed to cool to room temperature. This hydrolyzed yam starch suspension containing about 4% of the starch composition was used in the comparative tests which follow.

COMPARATIVE EXAMPLES

In order to compare and evaluate the efficiency of the various yam starch flocculants as settling aids, test flocculants were used to treat tar sand tailings.

The tar sand tailings used contained 1.93% solids (w/w) which are largely silts and clays. The fines are quite dispersed and tend to remain in suspension for a long period of time.

Settling Tests of Tar Sand Tailings Treated With Starch Flocculants 100 ml of the tar sand tailings was poured into a 100 ml cylinder and then 0.1 ml of alum (0.06 m-mole/l) was added to the tailings sample. The cylinder was inverted 5 times to mix the tailings with the alum. Then 0.25 ml of the 4% hydrolyzed yam starch flocculant suspension was poured into the cylinder. The cylinder was again inverted five times. The dosage of treatment is approximately 100 PPM. The same procedure used for a hydrolyzed wheat starch flocculant (as disclosed in U.S. Pat. No. 4,289,540) was used for comparison. The treated samples were then allowed to settle in the cylinders without further disturbance. The sediment heights were recorded periodically until little change was observed.

Kynch Analysis of the Settling Tests

Results of the settling tests were evaluated in terms of Kynch analysis which gives a settling time called "ultimate time" ($T_u$). $T_u$ is an indicator of the duration required for a sediment to reach close to the ultimate height and this parameter is used to evaluate the efficiency of settling aids in suspensions.

Another parameter for the expression of settling efficiency of sediments is called "Unit Area" which is defined as follows:

$$\text{Unit Area} = T_u/(C_o \times H_o)$$

where
$C_o$ = initial solids concentration (ton/cu. ft)
$H_o$ = initial height (ft)
$T_u$ = ultimate time (days)

Unit Area is expressed as sq. ft/ton/day. This is the area required to settle one ton of solids per day. Small Unit Area indicates efficient settling. The $T_u$ and unit areas of various hydrolyzed yam starch flocculant treated samples, a hydrolyzed wheat starch flocculant treated sample and an untreated sample are presented in Table I.

TABLE I

| TAILINGS TREATED WITH FLOCCULANT* | 1 | 2 | 3 | 4 | 5 | 6 | 7 | 8 | 9 | Untreated |
|---|---|---|---|---|---|---|---|---|---|---|
| $T_u$ in minutes | 68 | 73 | 85 | 110 | 130 | 98 | 116 | 153 | 98 | 1440 |
| Unit Area sq.ft/ton/day | 132.89 | 142.74 | 166.11 | 215.10 | 254.24 | 191.73 | 226.93 | 229.28 | 191.73 | 284.63 |

Settling Test Results of Various Hydrolyzed Flocculants

*Hydrolyzed Starch Samples From:
1. Cocoa Yam
2. Negro Yam
3. Sweet Yam
4. Rentica Yam
5. St. Vincent Yam
6. Yampy Yam
7. Yellow (1) Yam
8. Yellow (2) Yam
9. Wheat Starch (U.S. Pat. No. 4,289,540)

As can be seen from Table I not all yam starches are superior to the hydrolyzed wheat starch of U.S. Pat. No. 4,289,540. Only the hydrolyzed starch from Cocoa Yam, Negro Yam and Sweet Yam show the surprising superiority over the hydrolyzed wheat starch flocculant. The other yam starches yield flocculants which are inferior to the hydrolyzed wheat starch flocculant and, often, very much inferior.

Yams, of course, are well known and the term is usually applied to the tubers of various species of Dioscorea of the monocotyledonous family Dioscoreaceae. These are plants with thick tubers (generally a development of the base of the stem), from which the starch is obtained. Yams are generally grown in tropical or subtropical climates although some varieties are grown in North America and Great Britain. The species of yams used in this invention (e.g. Cocoa Yam, Negro Yam and Sweet Yam) are readily found on the island of Jamaica.

Extraction of the starch from the yam may be done in the usual manner of extracting starch from any of the various starch plants. The yam starch used in the above examples was obtained in the following manner:

To 15 pounds of the peeled, diced yam 1.5 gallons of water was added to which 15 gms of potassium metabisulphite had also been added to prevent discoloration. The mixture was chopped with water in a blender at low speed just long enough to break up the cells (approximately 2 mins.). Then, the mass was filtered through a No. 60 mesh (250 Micrometers) filter to remove the fibrous material from the starch suspension. The yam fibre was washed twice with fresh quantities of water and the starch suspensions combined and allowed to settle. Finally, the water was decanted and the starch was dried in an oven at 60° C. or sundried after which time it was ready for use.

It is clear from the above description and examples of the invention that a valuable contribution to the art of flocculants and flocculation has been made.

The invention claimed is:

1. In the process for the destabilization of colloidal sludge suspensions containing clay minerals or metal oxides-hydroxides, by treatment of said suspensions with an effective amount a flocculating reagent to substantially separate water from suspended solids, the improvement wherein the flocculating reagent is a hydrolyzed yam starch obtained by the aqueous hydrolysis of the starch in the presence of about 10 to 30 gms per 100 gms of starch of insoluble metal salts formed in situ, wherein the salts employed during the hydrolysis to form said insoluble salts are the soluble salts of metals selected from the group consisting of sodium, potassium, ammonium, magnesium, calcium, and aluminum, and respective anions of said soluble salts are selected from the group consisting of sulfates, acetates, chlorides, nitrates, chlorates, bromides, iodides, thiocyanates, and phosphates and wherein the yam starch is obtained from a yam selected from the group of Cocoa Yam, Negro Yam and Sweet Yam.

2. The process according to claim 1 wherein the sludge suspension is derived from bituminous tar sands mining operations.

3. The process according to claim 1 wherein the sludge suspension is a phosphate slime obtained from phosphate mining operations.

4. The process according to claim 1 wherein the hydrolyzed starch is calcium alumino phosphate yam starch.

5. The process according to claim 1 wherein the concentration of flocculating reagent in the sludge suspension is controlled to provide at least 50 parts per million.

* * * * *